United States Patent [19]

Moskvin

[11] Patent Number: 5,161,483

[45] Date of Patent: Nov. 10, 1992

[54] APPARATUS FOR DETERMINING THE YIELD OF MILK BY A MILKING MACHINE

[76] Inventor: Gennady A. Moskvin, ulitsa Satixmes, 49, kv. 59, Latviiskaya SSR, Elgava, U.S.S.R.

[21] Appl. No.: 773,670

[22] PCT Filed: Jan. 19, 1990

[86] PCT No.: PCT/SU90/00020
§ 371 Date: Sep. 17, 1991
§ 102(e) Date: Sep. 17, 1991

[87] PCT Pub. No.: WO91/10356
PCT Pub. Date: Jul. 25, 1991

[51] Int. Cl.$^5$ ............................. A01J 7/00; G01F 1/00
[52] U.S. Cl. ............................. 119/14.17; 73/861.49; 73/861
[58] Field of Search ............... 119/14.17, 14.14, 14.08; 73/861, 199, 861.42, 861.43, 861.44, 861.45, 861.46, 861.49

[56] References Cited

U.S. PATENT DOCUMENTS 4,485,763 12/1984 Icking .................. 119/14.17
5,012,762 5/1991 Moskvin ............... 119/14.17
5,016,569 5/1991 Moskvin ............... 119/14.17

FOREIGN PATENT DOCUMENTS 635935 12/1978 U.S.S.R. ............... 119/14.17

Primary Examiner—John G. Weiss
Attorney, Agent, or Firm—Lilling & Lilling

[57] ABSTRACT

The invention relates to animal-milking machinery. The apparatus for determining the yield of milk by a milking machine, comprises a discrete sensor including a reception chamber and a measurement chamber. The reception chamber receives a float element mounted on a hollow rod (11) carrying a permanent magnet and a valve member received in the measurement chamber a vacuum gauge includes an array of reed relays electrically connected to a computing unit, including a similar array of pulse counters, and being connected to a pickup arranged in the area occupied by the permanent magnet (13) as the level of milk in the discrete sensor rises to a predetermined level.

1 Claim, 2 Drawing Sheets

APPARATUS FOR DETERMINING THE YIELD OF MILK BY A MILKING MACHINE

FIELD OF THE INVENTION

The invention relates to animal-milking machinery, and more particularly it relates to apparatus for determining the yield of milk by a milking machine.

DESCRIPTION OF THE PRIOR ART

There is known an apparatus for determining the milk yield by a milking machine (SU, A, 657260), comprising a housing accommodating in it the reception and measurement chambers, and a reciprocable hollow rod with a side opening and a float mounted on the rod, and also with a valve member mounted on the lower end of the rod and received in the measurement chamber. The upper end of the hollow rod is closed, and its lower end is open. The reception and measurement chambers are separated by a partition with a central window establishing communication between the chambers. As the hollow rod moves, the side opening of this rod moves beyond the housing of the milk metering device, and the valve in the measurement chamber operates. As the valve in the measurement chamber thus operates, the mobile rod activates the counter mechanism keeping the count of the successive portions or doses of milk.

However, as the valve operates to close off the window in the partition, there takes place unchecked addition of an amount of milk to the measurement chamber due to the arising differential of the vacuum-gauge pressure in the measurement chamber and the atmospheric pressure in the reception chamber, which introduces inevitable error in keeping the count of the successive doses of milk. Furthermore, an additional error is introduced into the counting of the successive doses of milk by the mechanical linkage between the movable hollow rod of the metering device and the counter keeping count of these successive doses. This known apparatus lacks the means for adjusting the metering device for optimized volumes of milk doses in the actual operational environment of the milking machine on dairy farms.

There is further known a device for determining the yield of milk by a milking machine (SU, A, 1345059), comprising a discrete float-type sensor for metering out successive doses of milk, including a reception chamber with the inlet and outlet pipes and a measurement chamber with the outlet pipe, separated by a partition with a window therein. The measurement chamber receives therein a float element mounted on a hollow rod having an opening through its side wall situated outside the reception chamber to communicate with the ambient atmosphere as the hollow rod moves to the preset position in the direction of the rising level of milk in the discrete sensor. The hollow rod carries a permanent magnet adjacent to its closed end, and a valve member adjacent to its open end, accommodated in the measurement chamber under the partition with the window. This known apparatus further comprises a milk receptable of which the first inlet pipe is connected with the outlet pipe of the measurement chamber of the discrete sensor and the second inlet pipe is connected with the outlet pipe of the reception chamber of this sensor, of which the inlet pipe is connected to the milk-conveying vacuum line of the milking machine. The outlet pipe of the milk receptacle is connected to the vacuum line of the milking machine. The known apparatus also comprises a computing unit, a pickup for summing up the successive doses of milk, having its leads connected to the first input and first output of the computing unit, mounted in the area to which the permanent magnet mounted on the hollow rod is lifted when the milk in the discrete sensor rises to the predetermined level.

This known apparatus is devoid of the means for monitoring the variation of the vacuum-gauge pressure in the milking machine, which tends to introduce an error in determining the optimized portions of milk.

SUMMARY OF THE INVENTION

The present invention has for its object to create an apparatus for determining the yield of milk by a milking machine, which should account for unchecked portions of milk in the measurement chamber at variations of the vacuum-gauge pressure in the milking unit, thus enhancing the accuracy of measuring milk yields.

The object is attained in an apparatus for determining the yield of milk by a milking machine, comprising a discrete sensor of the float type for metering out successive doses of milk, including a reception chamber with an inlet pipe and an outlet pipe and a measurement chamber with an outlet pipe, separated by a partition with a window. The reception chamber accommodates a float element mounted on a hollow rod having an opening through its side wall situated outside the reception chamber to communicate with the ambient atmosphere as the hollow rod moves into a predetermined position in the direction of the rising level of the milk in the discrete sensor. A permanent magnet is mounted adjacent to the closed end of the hollow rod and a valve member is mounted adjacent to the open end of the hollow rod, received in the measurement chamber under the partition with the window. A milk receptacle has its first inlet pipe connected to the outlet pipe of the measurement chamber of the discrete sensor and its second inlet pipe connected with the outlet pipe of the reception chamber of the discrete sensor. The inlet pipe of the reception chamber is connected with the vacuum milk-conveying line of the milking machine, and the outlet pipe of the milk receptacle is connected to the vacuum line of the milking machine. A computing unit is included, and pickup for summing up the successive milk doses has its leads connected to the first input and first output of the computing unit and is arranged in the area occupied by the permanent magnet mounted on the hollow rod when milk in the discrete sensor rises to a predetermined level. A vacuum gauge communicates with the milk receptacle for measuring the level of vacuum in the milk receptacle of the milking machine and feeding out control signals for defining final correction of precorrected successive doses of milk dependent on the variation of vacuum in the milk receptacle. The computing unit includes an array of pulse counters corresponding to the coefficients of final correction of precorrected successive doses of milk. The vacuum gauge includes a movable indicator of the level of vacuum in the milk receptacle, carrying a permanent magnet cooperating with an array of reed relays intended each for sending out a control signal for activation/deactivation of the respective pulse counter, having their respective first leads connected to the first inputs of the respective pulse counters, the respective second inputs of all pulse counters being joined and connected to the first lead of the reed relay of the pickup for summing up the successive doses of milk, and its other lead being connected to the second leads of the reed relays of the vacuum gauge.

The invention provides for availability of accurate information on the quantity of milk yielded by different type of milking machines operated by dairy farms. The use of this information on the milk yield enhances the effectiveness of zootechnical, veterinary and breeding work conducted with the livestock. The invention represents a novel and promising trend in the evolution of apparatus for determining milk yields, based on the incorporation of microprocessor hardware in such apparatus, which expands the functional and metrological capabilities of the hardware used for measuring milk yields by milking machines. The use of accurate information obtainable by implementation of the present invention promotes higher milk yields and reduces the maintenance cost of milk counters, enhances the reliability and credibility of registration of milk production. An apparatus in accordance with the present invention is readily susceptible for incorporation in automated control systems of dairy farms.

With the present invention introducing the function of monitoring the measurement of vacuum levels in a milking machine and establishing a relationship between the vacuum value in the milking system and milk yield indicators, it has become possible to perform automatically the final correction of precorrected successive doses of milk in the process of milking animals in milking machines in real-life environments, which substantially enhances the accuracy of measuring milk yields by milking machines.

BRIEF DESCRIPTION OF THE DRAWINGS

The present invention will by further described in connection with its preferred embodiment, with reference being made to the accompanying drawings, wherein.

PREFERRED EMBODIMENT OF THE INVENTION

Figure 1:
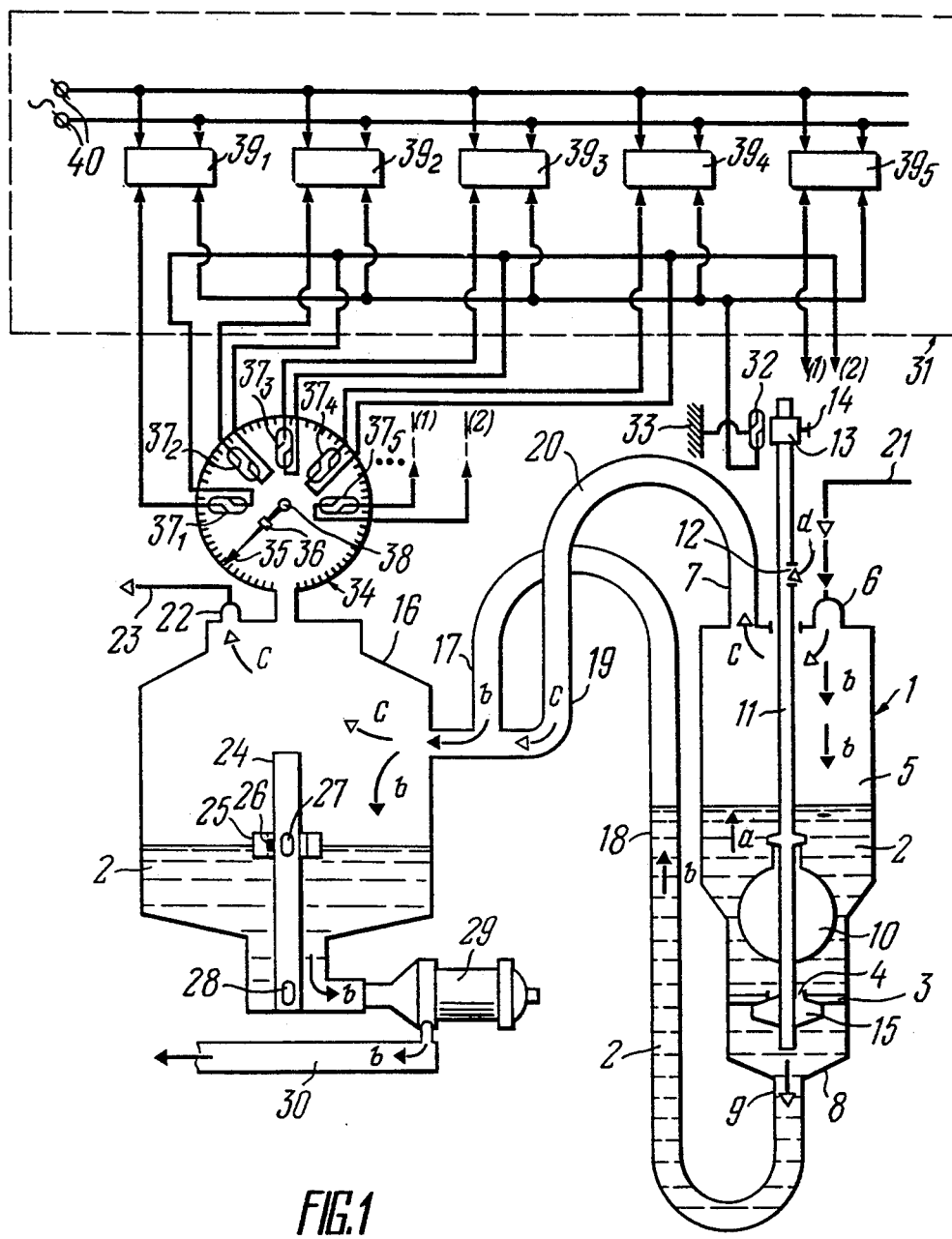
FIG. 1 illustrates schematically a general view of an apparatus for determining the yield of milk by a milking machine, and the circuitry of the computing unit including an array of pulse counters, with one of the counters operating, in accordance with the invention.

The apparatus for determining the yield of milk by a milking machine comprises a discrete sensor 1 (FIG. 1) of the float type for metering out successive individual doses of milk 2, including a partition 3 with a window 4, separating a reception chamber 5 with an inlet pipe 6 and an outlet pipe 7 from a measurement chamber 8 with an outlet pipe 9. The reception chamber 5 accommodates a float element 10 mounted on a hollow rod 11 having an opening 12 through its side wall, situated outside the reception chamber 5 to communicate with the ambient atmosphere as the hollow rod 11 rises to a predetermined position in the direction of the rising level of milk 2 in the discrete sensor 1, indicated in the drawing by the arrow "a".

Mounted on the hollow rod 11 adjacent to its closed top end is a permanent magnet 13 secured with the aid of a fastener 14, and a valve member 15 is mounted on the hollow rod 11 adjacent to its open bottom end, received in the measurement chamber 8 to underlie the window 4 in the partition 3. The valve member 15 is preferably made of an elastic material, e.g. rubber.

The apparatus for determining the milk yield further comprises a milk receptacle 16 of which the inlet pipe 17 communicates via a line 18 with the outlet 9 on the measurement chamber 8 of the discrete sensor 1. The other inlet pipe 19 of the milk receptacle 16 is connected via a line 20 with the outlet pipe 7 of the reception chamber 5 of the discrete sensor 1. The inlet pipe 6 of the reception chamber 5 is connected to the main milk-conveying vacuum line 21 of the milking machine (not shown). Outlet pipe 22 of the milk receptacle 16 is connected to the vacuum line 23 of the milking machine.

The milk receptacle 16 accommodates a hollow rod 24 of a non-magnetic material receiving about it slidingly a float 25 (adapted to move along the rod 24 as the level of milk 2 in the milk receptacle 16 varies) carrying a magnet 26 adapted to cooperate with a magnet-controlled sealed reed relay 27 (to be hereinafter referred to as a "reed relay" for brevity sake) and a reed relay 28, respectively, for activating and deactivating a pump 29 for feeding milk for further treatment via a line 30. Arrows "b" indicate the direction of delivery of the liquid fraction of milk 32 in the milking machine, whereas arrows "c" indicate the direction of progress of the gas-air fraction of milk 2.

The disclosed apparatus for determining the yield of milk by a milking machine further comprises a computing unit 31 and a pickup 32 for summing up the successive individual doses of milk, having its leads connected to the first input and first output of the computing unit 31, the pickup 32 being mounted on a bracket 33 adjacent to the position occupied by the permanent magnet 13 as the milk 2 in the discrete sensor 1 rises to the predetermined level. The apparatus for determining the yield of milk by a milking machine also comprises a vacuum gauge 34 communicating with the milk receptacle 16 for measuring the level of vacuum in the milk receptacle 16 and feeding out control signals for defining final correction of precorrected successive doses of milk, dependent on the level of vacuum in the milk receptacle 16. The vacuum gauge 34 has a movable indicator 35 of the vacuum level in the milk receptacle 16, carrying a permanent magnet 36 for cooperation with an array of reed relays $37_1$, $37_2$, . . . , $37_n$ whose number is determined by the selected level of discretization of the individually corrected counts of the doses of milk in dependence on the actual level of vacuum in the milk receptacle 16. In the embodiment being described, the number "n" of the reed relays 37 is five. The first and second leads of each reed relay $37_1$, $37_2$, . . . , $37_5$ are connected to the respective inputs and outputs of the computing unit 31. The movable indicator is mounted for pivoting on a shaft 38.

In the process of milking animals by the milking machine, the reception and measurement chambers 5 and 8 of the discrete sensor 1 and some of the line 18 are filled with milk 2 which is supplied into the receptacle 16 in successive metered out doses. The arrow "d" indicates the direction of the flow of air via the opening 12 in the hollow rod 11 at a pressure equalling the atmospheric pressure.

At the initial stage of the filling up of the measurement chamber 8, the opening 12 in the hollow rod 11 is situated inside the internal space of the reception chamber 5 of the discrete sensor 1, and the permanent magnet 13 is beyond the area of activation of the pickup 32 for summing up the successive doses of milk.

The computing unit 31 includes an array of pulse counters $39_1, 39_2, \ldots, 39_5$ corresponding to the respective coefficients of correction of the precorrected successive doses of milk, connected to the terminals of an a.c. voltage source 40. The respective first input of each pulse counter $39_1, 39_2, 39_3, 39_4, 39_5$ is connected to the first lead of the respective reed relay $37_1, 37_2, 37_3, 37_4, 37_5$, the other leads of the reed relays $37_1, 37_2, 37_3, 37_4, 37_5$ being joined and connected to the first lead of the pickup 32 whose other lead is connected to the joined second inputs of the counters $39_1, 39_2, 39_3, 39_4, 39_5$ of which the respective third and fourth inputs are connected to the respective terminals of the a.c. voltage source 40.

Figure 2:
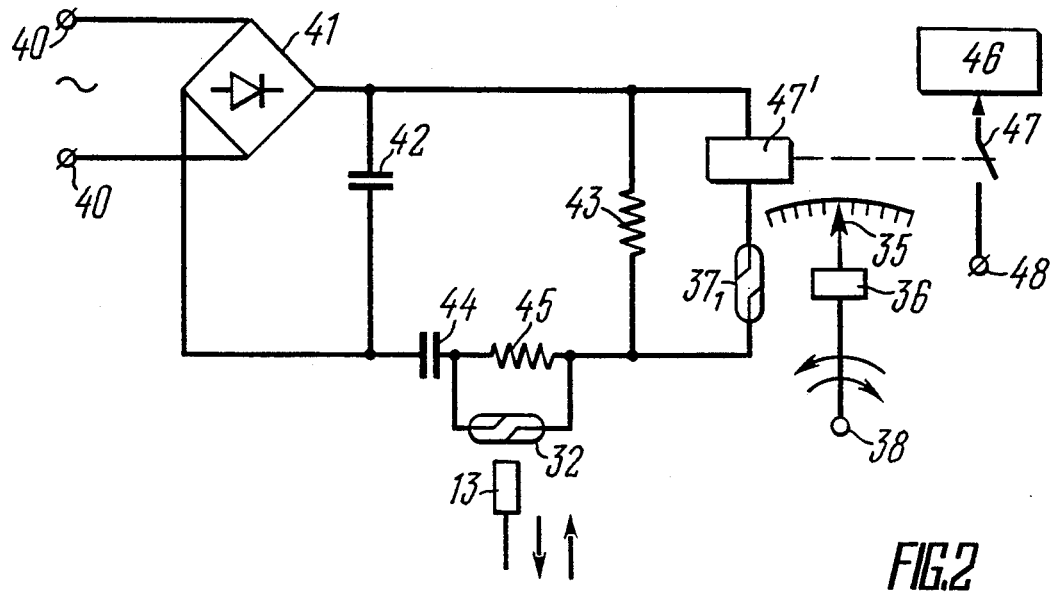
FIG. 2 is a circuit diagram of a pulse counter corresponding to the rated value of vacuum in the milk receptacle of a milking machine, according to the invention.

Each pulse counter $39_1-39_5$ includes a bridge circuit 41 (FIG. 2) whose opposite junctions are connected to the respective terminals of the voltage source 40, a ripple filter including a capacitor 42 connected across the two other opposite junctions of the bridge circuit 41 and a resistor 43, a spark-quenching circuit including a capacitor 44 and a resistor 45 connected in series between the like leads of the capacitor 42 and resistor 43, and an electromechanical counting adder unit 46 having its input connected via a n.o. contact of a relay 47 to the terminal 48 of the voltage source (not shown). The coil 47' of the relay 47 has its one lead connected to one lead of the resistor 43 and its other lead connected to the first lead of the respective one of the reed relays $37_1-37_5$, e.g. of the reed relay $37_1$ of which the other lead is connected to the other lead of the resistor 43. The reed relay of the pickup 32 is connected in parallel with the spark-quenching circuit 44, 45.

Figure 3:
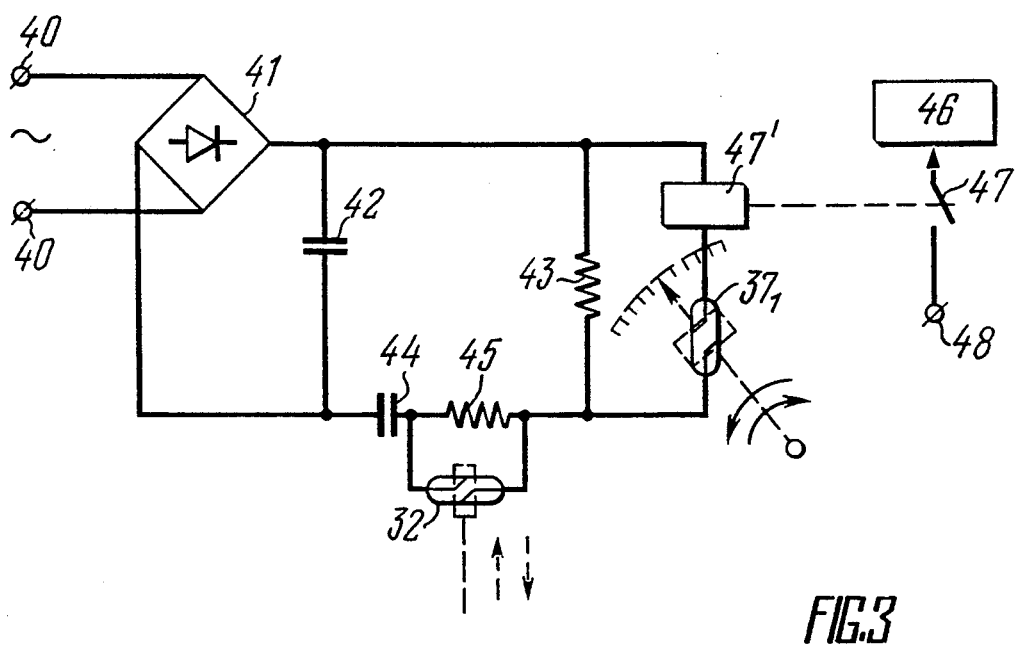
FIG. 3 is a circuit diagram of the pulse counter when the level of vacuum in the milk receptacle of a milking machine attains the rated value, in accordance with the invention.

FIG. 3 illustrates the state of the circuitry, e.g. of the pulse counter $39_1$, when the vacuum level in the milk receptacle 16 (FIG. 1) of the milking machine attains the rated value corresponding to the actuation of the reed relay $37_1$ (or else when the vacuum level deviates from the rated value to a degree corresponding to the activation of another reed relay 37 of the array). In this situation the circuit of the coil 47' (FIG. 3) of the respective relay 47 is completed, and its n.o. contact closes.

The operation of the disclosed apparatus for determining the yield of milk by a milking is principally, as follows.

As a preliminary stage of the operation, there is simulated the cow-milking process, using milk freshly milked from milking cows. The preliminary stage is performed to adjust or calibrate the disclosed apparatus for determining the yield of milk by a milking unit. The essence of the adjustment of the apparatus at the preliminary starge of its operation resides in determining, in accordance with the available algorithms, the coefficients of precorrection of the individual successive doses of milk in the process of simulation milking, reproducing the working environment of the milking unit and of the discrete sensors of successive doses of milk in accordance with the invention, and thus accounting for the specific operating conditions, the milk properties and the actual design of the discrete sensor of successive doses of milk, using also a standard measure of the quantity of yielded milk.

This is achieved at the preliminary stage of operation of the disclosed apparatus for determining the yield of milk by a milking machine by setting the working level of vacuum in the milk receptacle 16 (FIG. 1) of the milking machine according to its given type, e.g. close to 0.53 kg(f)/cm$^2$, and turning on the voltage source of the pulse counters $39_1-39_5$, with the intake of the milking machine dipped into a vessel filled with the standard measure of the quantity of yielded milk weighed in advance with the accuracy of 1/6 th of the predetermined degree of accuracy of determination of the yield of milk by the milking machine. The milking process is simulated with the pulsator of the milking machine operating.

With the intake of the milking machine submerged in the standard measure of the quantity of fresh milk, milk is taken up by the main milk-conveying vacuum line 21 of the milking machine and flows into the inlet pipe 6 of the reception chamber 5 of the discrete sensor 1 of the successive doses of milk 2.

Thus, milk 2 flows down the reception chamber 5 through the window 4 in the partition 3 into the measurement chamber, while air is withdrawn through the reception chamber 5 and the outlet pipe 7 via the line 20 into the milk receptacle 16, and then via the outlet pipe 22 of the milk receptacle 16 and the vacuum line 23 of the milking machine.

Meanwhile, the opening 12 through the wall of the hollow rod 11 is within the reception chamber 5 and thus communicates with the vacuum line 23 of the milking machine via the milk receptacle 16. While filling up the measurement chamber 8, milk 2 has its level rising in this measurement chamber 8, whereafter it overflows the partition 3 through its window 4 as the milking simulation process goes on, reaching the level of the float element 10.

With the level of milk 2 in the sensor 1 rising still higher, the float element 10 also starts rising vertically, carrying with it the hollow rod 11 with its side opening 12, and the permanent magnet 14 and valve member 15 mounted on the rod 11, the valve member 15 approaching the window 4 in the partition 3 and tending to close this window 4 by its elastic surface.

In this situation the valve member 15 and, hence, the float element 10 are acted upon by the vacuum-gauge pressure equalling the pressure in the milk receptacle 16 and amounting to the rated value of the working vacuum in the milking operation, i.e. 0.53 kg(f)/cm$^2$ according to one standard milking technology. Thus, the actual level of vacuum in the milk receptacle 16 defines the exact moment of the closing off of the window 4 in the partition 3 by the valve member 15. The higher the value of vacuum in the milk receptacle 16, the greater is the lag in the closing off of the window 4 by the valve member 15. When the level of vacuum in the milk receptacle 16 is stable, e.g. equalling the standard value of 0.53 kg(f)/cm$^2$ for the given type of the milking machine, the metering out of successive doses of milk 2 by the float-type discrete sensor 1 is likewise fairly stable. However, in real life the exact amount of each dose is practically unknown, as the existing milking systems fail to maintain the stability of the successive doses of milk 2. In reality, the valve of each individual dose of milk 2 is substantially affected not only by the properties and parameters of fresh milk 2, but also by the design and operating parameters of the milking machine and of the discrete sensor 1, and also by the value of vacuum in the milk receptacle 16 governing the additional, unaccounted-for portions of milk 2 associated with the lag in the closing off of the window 4 in the partition 3 by the valve member 15. This amount of either excessive or lacking milk in each successive dose in comparison with the estimated average dose of milk 2 in the measurement chamber 8 of the discrete sensor 1, if not accounted for, is capable of introducing a substantial error into the determination of the yield of milk by a milking machine. Thus, during the preliminary stage being described, there is eliminated the systematic error of measurement of successive doses of milk 2 brought about by the actual properties of milk and various permanent design and operational factors associated with the given type of the discrete sensor 1 and the given milking machine in their operating environment on a farm.

The opening 12 through the wall of the hollow rod 11 is positioned so that when the valve member 15 approaches the window 4 in the partition 3, the opening 12 is already lifted outside the housing of the reception chamber 5 to communicate with the ambient atmosphere, so that the atmospheric pressure is set within the chamber 8 via the open bottom end of the hollow rod 11.

The atmospheric pressure acts from below upon the valve member 15, and the difference between the vacuum valve in the reception chamber 5 and the atmospheric pressure in the measurement chamber 8 makes the valve member 15 respond promptly and close off the window 4 in the partition 3 of the sensor 1 by its elastic surface.

At the same time, the atmospheric pressure acts upon the portion of milk 2 in the measurement chamber 8, and the pressure differential across the milk receptacle 16 and the measurement chamber 8 drives the portion of milk 2 via the outlet pipe 9 and line 18 into the milk receptacle 16.

The permanent magnet 13 mounted at the top of the hollow rod 11 is positioned so that, when the valve member 15 closes the window 4, the permanent magnet 13 is lifted to activate the reed relay of the pickup 32 for summing up the successive doses of milk, and the delivered dose of milk 2 is automatically registered, according to the invention, by the respective pulse counter, e.g. the pulse counter $39_1$.

One of the reed relays 37 of the group, e.g. the reed relay $37_1$, is set at the scale of the vacuum gauge 34 to correspond in the simulation process to the rated value of vacuum in the milk receptacle 16, e.g. equalling 0.53 kg(f)/cm$^2$, so that the vacuum level indicator 35 with its permanent magnet 36 should occupy the position in which the field of the permanent magnet 36 activates the reed relay $37_1$.

Consequently, the electric circuit of the coil 47' (FIG. 2) of the relay 47 of the pulse counter $39_1$ is completed, as shown in FIG. 3. In other words, as the permanent magnet 13 (FIG. 1) on the hollow rod 11 is lifted to activate the reed relay of the pickup 32 for summing up the successive doses of milk, the circuit of the coil 47' (FIG. 3) of the relay 47, e.g. of the pulse counter $39_1$ (FIG. 1) is completed, activating thus the electromechanical counting adder 46 which registers the pulses coming from the discrete sensor 1 according to the invention.

Now, with the successive dose of milk 2 metered out by the discrete sensor 1 having been automatically registered by the pulse counter $39_1$ and delivered by the action of the atmospheric pressure into the milk receptacle 16, the measurement chamber remains under the atmospheric pressure which is also supplied via the receptacle 16, its inlet pipe 19 and line 20 to the reception chamber 5, so that the pressure in the chambers 5 and 8 is levelled out. The hollow rod 11 with its float element 10, valve member 15 and permanent magnet 13 drops by gravity, and the window 4 in the partition 3 is opened. Another dose of milk 2 flows into the reception and measurement chambers 5 and 8, and the simulation process of metering out successive doses of milk 2 from the standard quantity is continued until this standard quantity or measure is exhausted.

The readings of the pulse counter $39_1$ which has registered the number of the successive doses and the value of the standard quantity of milk are used to determine from the available algorithms the coefficient of precorrection corresponding to the vacuum level of 0.53 kg(f)/cm$^2$, to be accounted for in determining the yield of milk by the milking machine.

The operation of the disclosed apparatus at the preliminary stage of simulation of the milking process is continued in a similar manner to calibrate the apparatus for other predetermined values of vacuum in the milking system, different from the rated value, e.g. of 0.53 kg(f)/cm$^2$.

As the value of vacuum in the milk receptacle 16 in real-life operating environments may vary within a relatively broad range (e.g. from 0.45 to 0.55 kg(f)/cm$^2$) on account of the varying number of simultaneously operating milking units and the number of simultaneously milked cows, of taking-in of air at moments when teat cups are connected to cows' udders, it is expedient to conduct the abovementioned calibration operations in the actual operating environment of the milking machine in question, at discrete vacuum levels making up the actual possible range of variations of the vacuum level in the process of milking and determining the yield of milk. Thus, by operating a vacuum regulator (or else by artificially bleeding air into the vacuum line of the milking machine), there is set the vacuum level of 0.50 kg(f)/cm$^2$ - the new value - in the milk receptacle 16 by the readings of the indicator 35 of the vacuum gauge 34, the reed relay $37_2$ is set accordingly, and the abovedescribed operations are repeated for calibrating the pulse counter $39_2$. Then another value of vacuum, e.g. 0.48 kg(f)/cm$^2$ is set, and the operations of the preliminary stage are repeated once again. As a result, the reed relays $37_1$, $37_2$, $37_3$, $37_4$, $37_5$ are ultimately positioned at the scale of the vacuum gauge 34 to be activated by the permanent magnet 36 on the movable indicator arm 35 at the corresponding discrete values of vacuum in the milking system, i.e. in the milk receptacle 16, each of them being electrically connected with the respective one of the pulse counters $39_1$, $39_2$, $39_3$, $39_4$, $39_5$.

As a result of the preliminary stage, the readings of the pulse counters $39_1$, $39_2$, $39_3$, $39_4$, and $39_5$ corresponding to the amounts of the successive doses of milk 2 metered out from the standard quantity are employed, in accordance with the selected algorithms, to define the coefficients $K_1$, $K_2$, $K_3$, $K_4$ and $K_5$ of final correction of individual doses of milk corresponding to the respective discrete values of vacuum in the milk receptacle 16.

Thus, in accordance with the invention, the total quantity of the milk yield is found from:

$$Y_{tot} = AK_1 + BK_2 + CK_3 + DK_4 + EK_5 + \ldots + MK_n,$$

where A, B, C, D, E, M are the readings of the pulse counters registering the successive doses of milk at the respective "n" levels of vacuum in the milk receptacle 16;

$K_1$, $K_2$, $K_3$, $K_4$, $K_5$, $K_n$ are the coefficients of final correction of individual doses of milk at "n" levels of vacuum in the milk receptacle 16.

With the disclosed apparatus embodying the present invention featuring continuous final correction of errors in accounting for the successive metered out milk doses at variation of the value of vacuum in the milking machine in determining the yield of milk by the milking machine, the milk yields are registered with enhanced accuracy, promoting higher effectiveness of zootechnical, veterinary and breeding work conducted with the dairy cattle, as well as better commercial results.

This is due to the final correction of the successive precorrected doses of milk formed in the discrete sensor 1 providing to account for previously unaccounted-for portions of milk 2 in the measurement chamber 8 at the varying vacuum-gauge pressure in the milking unit, enhancing ultimately the accuracy of determining the yields of milk by milking machines.

INDUSTRIAL APPLICABILITY

The invention can be implemented in vacuum animal-milking systems for accurately determining the yield of milk by the animals, allowing to step up the effectiveness of the zootechnical, veterinary and breeding work conducted with the livestock.

I claim:

1. An apparatus for determining the yield of milk by a milking machine, comprising a discrete sensor for metering out successive doses of milk, including a reception chamber with an inlet pipe and an outlet pipe and a measurement chamber with an outlet pipe, said reception chamber and said measurement chamber being separated by a partition with a window, the reception chamber accommodating a float element mounted on a hollow rod having an opening through a side wall situated outside the reception chamber to communicate with the ambient atmosphere as the hollow rod moves into a predetermined positon in the direction of the rising level of milk in the discrete sensor, with a permanent magnet mounted adjacent to a closed end of the hollow rod and a valve member mounted adjacent to an open end of the hollow rod, received in the measurement chamber under the partition with the window; a milk receptacle having a first inlet pipe connected to the outlet pipe of the measurement chamber of the discrete sensor and a second inlet pipe connected with the outlet pipe of the reception chamber of the discrete sensor, the inlet pipe of the reception chamber being connected with a vacuum milk-conveying line of the milking machine, an outlet pipe of the milk receptacle being connected to a vacuum line of the milking machine, (a computing unit), a pickup for summing up the successive milk doses having leads connected to a first input and a first output of the computing unit, arranged in an area occupied by the permanent magnet mounted on the hollow rod when milk in the discrete sensor rises to a predetermined level, a vacuum gauge communicating with the milk receptacle, intended for measuring the level of vacuum in the milk receptacle of the milking machine and feeding out control signals for defining final correction of precorrected successive doses of milk dependent on the variation of a vacuum valve in the milk receptacle, the computing unit including an array of pulse counters corresponding to the coefficients of final correction of precorrected successive doses of milk, the vacuum gauge including a movable indicator of the level of vacuum in the milk receptacle, carrying a permanent magnet cooperating with an array of reed relays intended each for sending out a control signal for activation/deactivation of the respective pulse counter, having their respective first leads connected to first inputs of the respective pulse counters, respective second inputs of all pulse counters being joined and connected to the first lead of the reed relay of the pickup for summing up the successive doses of milk, a second lead being connected to second leads of the reed relays of the vacuum gauge.

* * * * *